June 14, 1938. H. ROSENBERG 2,120,650
MACHINE FOR MAKING CAPPED NUTS FROM THIMBLES
Original Filed May 21, 1935 4 Sheets-Sheet 3
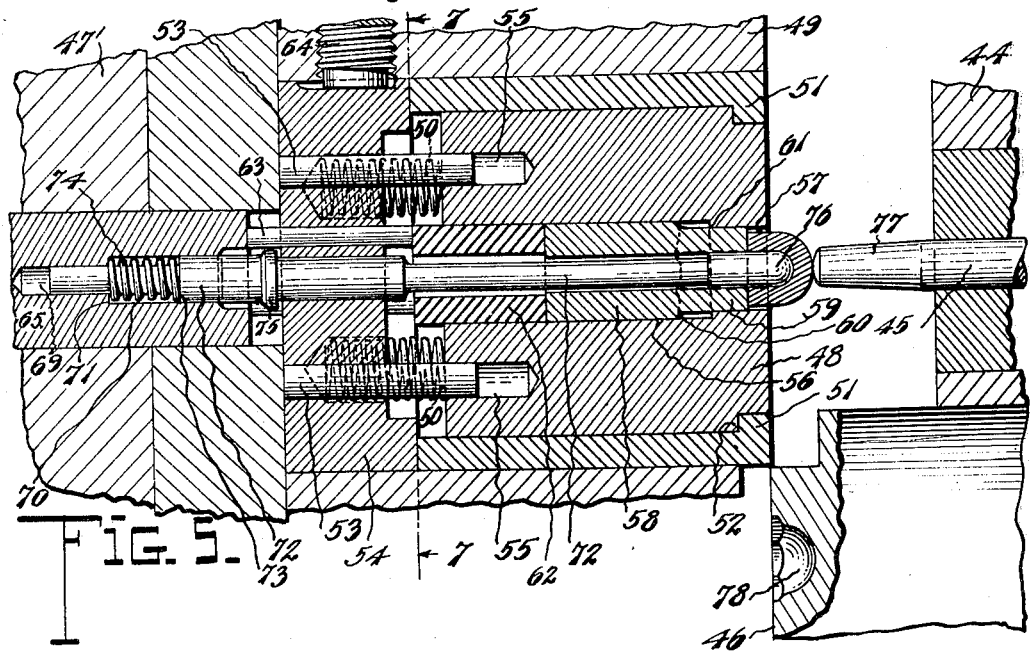
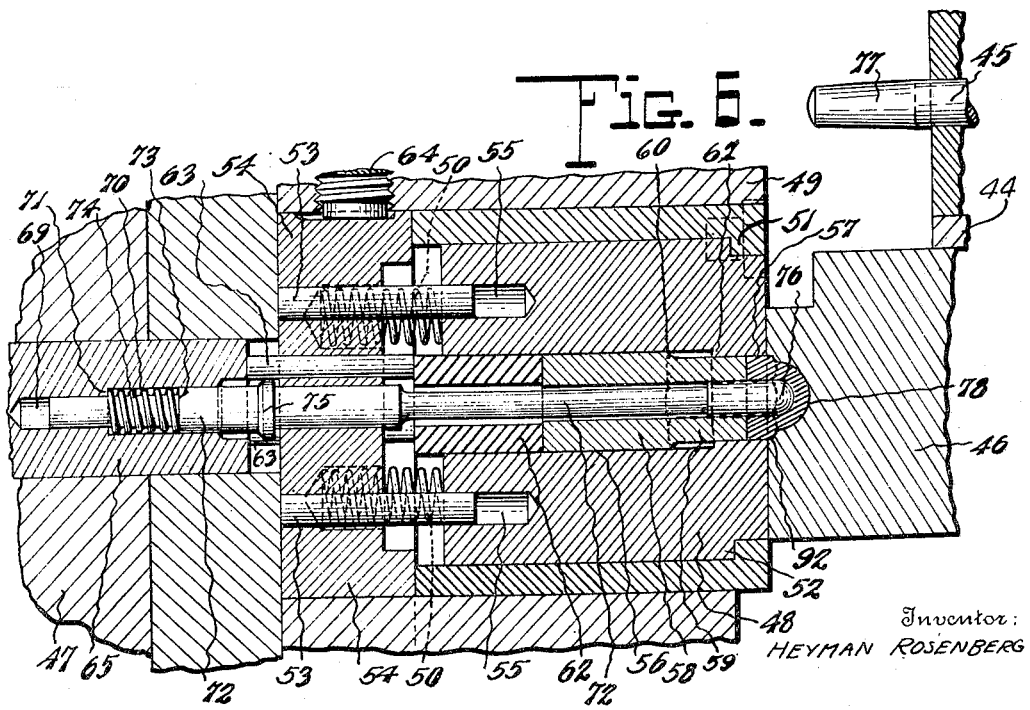
Inventor:
HEYMAN ROSENBERG
By Clarence M. Crews
Attorney June 14, 1938.  H. ROSENBERG  2,120,650
MACHINE FOR MAKING CAPPED NUTS FROM THIMBLES
Original Filed May 21, 1935    4 Sheets-Sheet 4
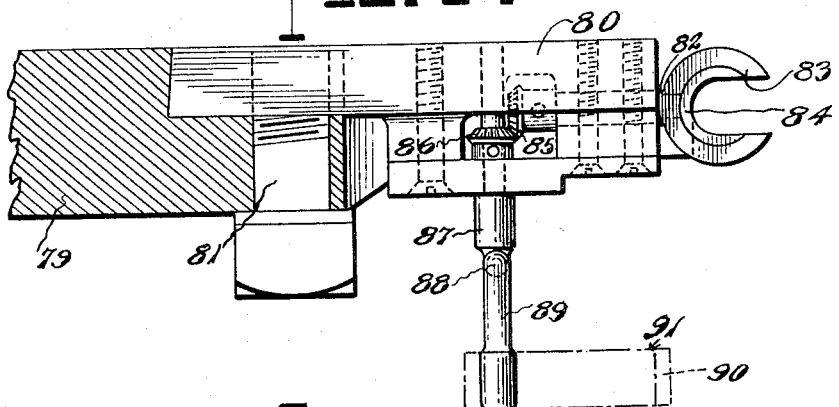
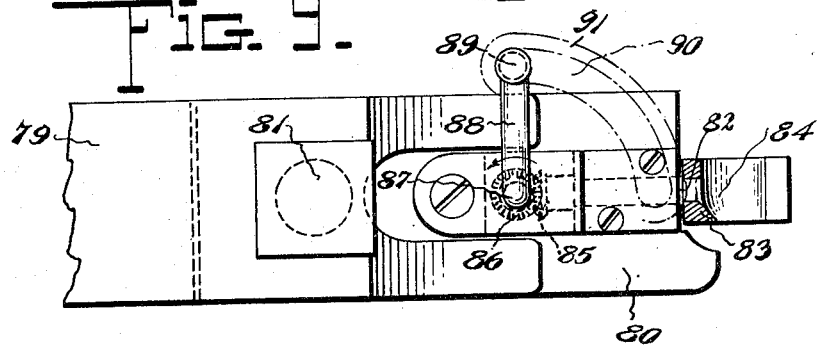
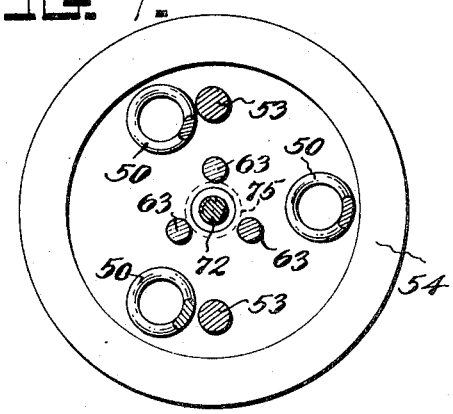
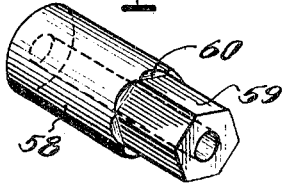
Inventor;
HEYMAN ROSENBERG
By Clarence M. Crews.
Attorney Patented June 14, 1938

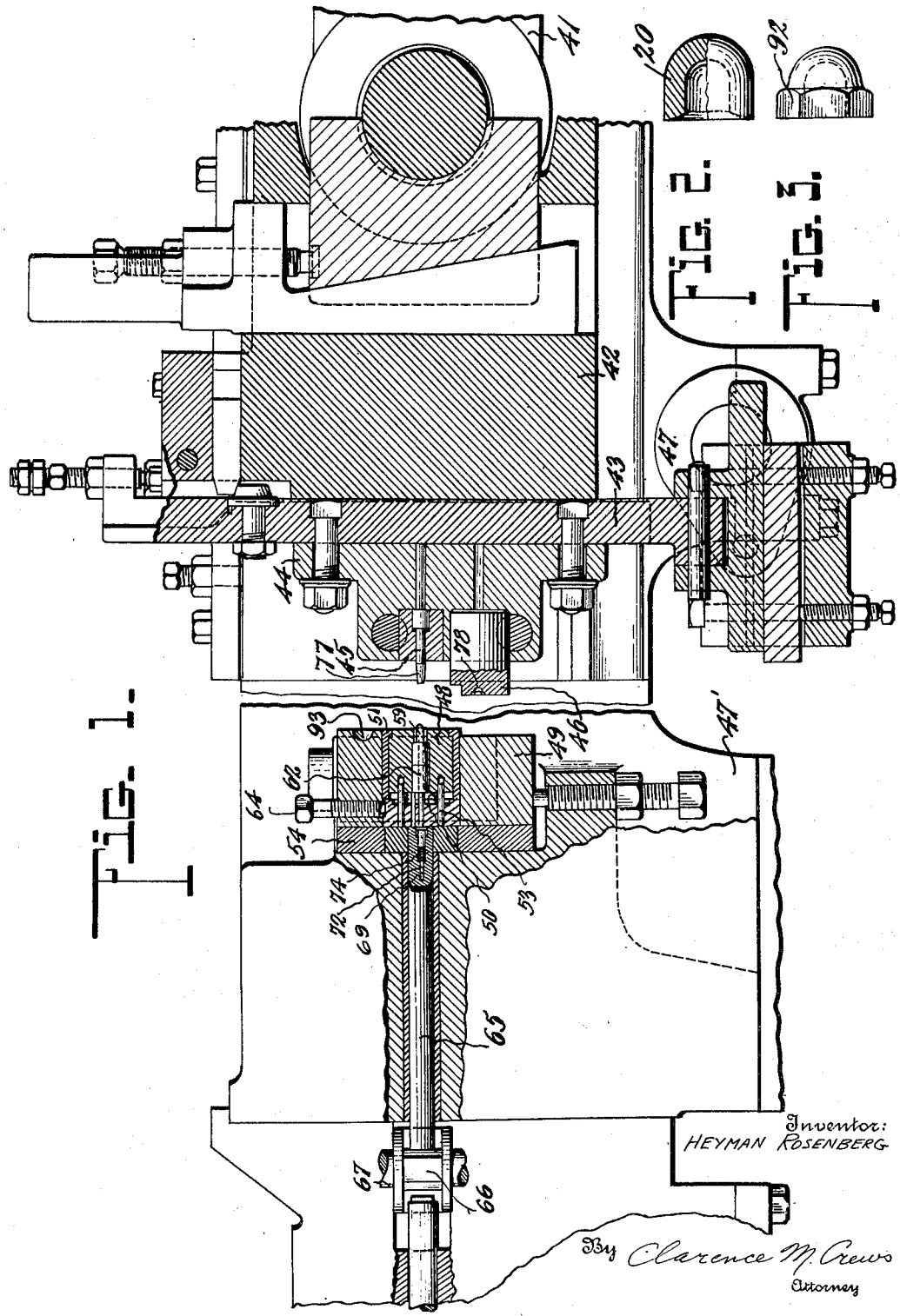

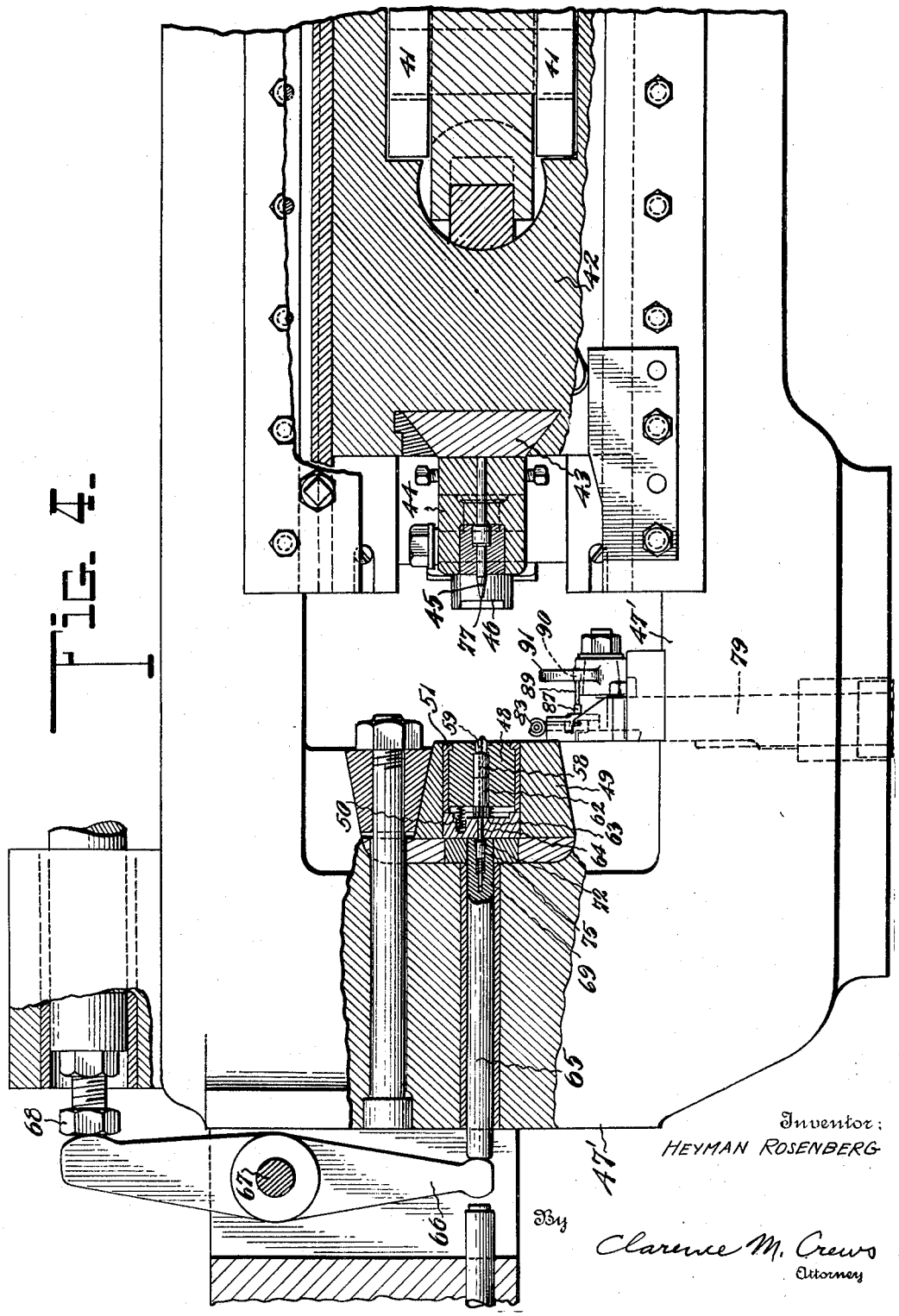

2,120,650

UNITED STATES PATENT OFFICE 2,120,650

MACHINE FOR MAKING CAPPED NUTS FROM THIMBLES

Heyman Rosenberg, New York, N. Y.

Original application May 21, 1935, Serial No. 22,593, now Patent No. 2,090,641, dated August 24, 1937. Divided and this application June 18, 1937, Serial No. 148,897

14 Claims. (Cl. 10—76)

This application is a division of my pending application Serial No. 22,593 filed May 21, 1935 for Art of producing capped nut blanks. In that application, disclosure is made of methods and apparatus for die-forming capped nut blanks from either slugs or sheets of metal. Briefly, the method, which is disclosed and claimed in said application, involves die-forming a slug or disc of metal into a thimble-like shell or blank, and then die-forming the thimble-like blank to convert it into a blank having the proper external and internal configuration of a finished, but unthreaded, capped nut.

The said application also discloses but does not claim three machines used in practicing the claimed method; namely, a machine for forming the thimble-like blanks from slugs, a machine for forming thimble-like blanks from sheet metal, and a machine for converting the thimble-like blanks into unthreaded capped nut blanks. The present application is concerned with the third of these machines, the one for converting the thimble-like blanks into unthreaded capped nut blanks.

It is an object of the present invention to provide a machine capable of converting thimble-like blanks, by a die-forming operation, into blanks having the proper contour of finished but unthreaded capped nut blanks.

It is a further object of the invention to provide a machine of the character stated which is capable of operating at a high speed and in an automatic manner, with substantially no other attention or supervision than the occasional replenishing of the supply of thimble-like blanks in a feeding hopper.

The conversion of a blank is desirably accomplished by solidly supporting the internal bore and the external dome portions of the thimble-like blank while longitudinally compressing and laterally spreading and thickening the skirt portion of the blank to re-shape the skirt portion to a desired external configuration.

In one highly advantageous and practical form of the machine embodying the invention provision is made of a supporting and centering finger upon which the blank is initially impaled. The centering finger extends through a matrix die which has a bore therein larger than the skirt portion of the thimble-like blank and of the cross-sectional size and shape which are to be given to the exterior surface of the skirt portion of the blank. A cooperative plunger die is provided which has a cavity or recess in its face, the mouth portion of the cavity being of the same size and shape as the bore of the matrix die, and the interior portion of the cavity being of substantially the same size and shape as the dome portion of the thimble-like blank. The centering finger and the matrix die are yieldingly supported against the thrust of the plunger die and may, therefore, retreat under pressure exerted by the plunger die. A sleeve is interposed between the matrix die and the centering finger and is positively supported in a retracted position against the thrust of the plunger die. As the plunger die is thrust home, it engages and surrounds the dome portion of the blank and it surrounds but does not engage a portion of the skirt of the blank. The mouth portion of the plunger die forms with the matrix die, the centering finger, and the sleeve, a forming space which is of fixed cross-sectional size and shape but which may be reduced in length as the plunger die moves toward the unyielding end face of the sleeve. Thus, the skirt portion of the blank is compressed longitudinally and at the same time spread and thickened laterally to fill the entire forming space remaining at the end of the forming stroke of the plunger die.

After the blank has been thus re-shaped, the plunger die is caused to retreat and the sleeve is thereupon projected outward to strip the finished blank from the matrix die and from the centering finger.

In order that the machine may operate rapidly and with high efficiency, provision is made for automatically impaling a thimble-like blank upon the centering finger between each two successive forming strokes of the plunger die. To this end, provision is made of a blank carrier for receiving the blanks one by one at one side of the centering finger and for carrying them into position to be impaled upon the finger. Most desirably, the carrier is constructed and arranged to receive a vertically delivered blank in a mouth-upward attitude and to turn the blank as it carries the blank toward the centering finger, so that the blank will be aligned with the centering finger with its mouth facing horizontally and toward the centering finger.

A push-on pin is desirably provided for thrusting each blank onto the centering finger as the blank is delivered into position to be thrust onto the centering finger. The push-on pin and the plunger die are desirably carried by the plunger of a double stroke header. The push-on pin and the plunger die are alternately moved toward the centering finger in alignment therewith, at alternate forward stroke of the plunger. Thus, at the first or push-on stroke, a blank is impaled on the centering finger, then at the second or forming stroke the blank is formed or re-shaped by the plunger die in cooperation with the other die means. As the plunger die retreats following the forming stroke, the finished blank is stripped from the matrix die and from the centering finger.

Other objects and advantages will hereinafter appear.

In the drawings forming part of this specification and illustrating a practical and highly advantageous embodiment of the invention, Figure 1 is a view partly in side elevation and partly in vertical section of a double stroke header equipped with instrumentalities for converting thimble-like blanks into capped nut blanks;

Figure 2 is a view in side elevation, partly broken away, showing a thimble-like blank of the kind upon which the machine of Figure 1 is adapted to operate;

Figure 3 is a view in side elevation of a completed blank resulting from the operation of the machine of Figure 1 upon the blank of Figure 2;

Figure 4 is a view partly in plan and partly in horizontal section of the machine of Figure 1;

Figure 5 is an enlarged, fragmentary, vertical sectional view through the dies and cooperating parts of the machine shown in Figures 1 and 4, the parts being shown in the positions occupied by them at the conclusion of the first or push-on stroke of the header plunger and just prior to the receding stroke;

Figure 6 is a view similar to Figure 5 but showing the parts in positions occupied by them at or shortly after the conclusion of the second or forming stroke;

Figure 7 is a detailed view in elevation of the retainer disc detached, parts being shown in section, and the section being taken on the section line 7—7 of Figure 5 looking in the direction of the arrows;

Figure 8 is a view partly in plan and partly in horizontal section of the blank feeding carriage and mechanism for shifting the blank to the proper angularity to effect registration thereof with the centering finger;

Figure 9 is a view in side elevation of the parts shown in Figure 8; and

Figure 10 is a perspective view of the knock-out sleeve.

As has been indicated above, the illustrative machine is a standard header in which instrumentalities have been embodied for enabling it to convert thimble-like blanks into capped nut blanks.

It is, of course, well understood in the industry that a header is a machine for forging enlargements on the ends of rod or wire blanks in the course of manufacturing nails, screws, bolts, and like fasteners. One of the earlier and simpler forms of header is disclosed more or less diagrammatically in U. S. Patent to T. Ferry, No. 1,069,659, dated August 5, 1913. The header shown in the Ferry patent is of the double stroke type, that is to say, a forming or matrix die is located to receive material to be treated by two plunger dies, one of which is caused to approach and act upon the material at one stroke of the machine, and then to shift out of line while the other shifts into line and acts on the material during the next stroke. Headers have become somewhat more complicated and more efficient than the illustration in the patent just mentioned, but the principle generally remains the same in the two-stroke headers. An illustration of a modern and efficient header is found in the product now being marketed by the Waterbury Farrel Foundry & Machine Company, of Waterbury, Connecticut, and the present invention is well adapted to be exemplified in a machine of that type, and especially of the type popularly referred to as a solid-die, double-stroke, high speed crank header. Parts of this header are disclosed in the patent to C. O. Petitjean No. 1,478,356, dated December 18, 1923. Parts commonly known and popularly used on such headers are in part omitted and in part shown in the accompanying drawings, so much only being illustrated as is adapted for facilitating disclosure of the present invention. Detailed description of parts that are thus commonly known and are not directly modified by the present invention is omitted as not needed.

The illustrative header is provided with the usual pitman 41, connected to impart the requisite thrusts to a die block 42. A plunger slide 43 is carried by the die block 42 in position to slide vertically thereon, that is, across the rectilinear, horizontal path of reciprocation of the die block 42, while being carried by the die block and receiving thrusts therefrom. A die carrier 44 is mounted on the plunger slide 43 and carries a push-on finger 45 and a plunger die 46 which are spaced vertically apart, the former above the latter. Appropriate apparatus, such as a crank 47 and its connected parts, impart timed vertical shifting movement to the plunger slide 43 to cause the push-on finger 45 to operate and then to move up out of the way, and the plunger die 46 then to operate. The parts referred to are appropriately mounted on a suitable bed or framework 47' having an internal space accommodating the push-on finger 45 and the plunger die 46 for movement toward and from a cooperating, opposed matrix die 48. The matrix die is of the type commonly known as "floating" since it is mounted in a die block 49 with capacity to yield in response to the thrust of the plunger die 46. The die 48 is stressed outward, that is, toward the die carrier 44, by appropriate springs 50, 50, and is held against movement outward beyond the face of the die block 49 by overlapping shoulders at the outer end of the matrix die, such as a shoulder 51 carried by the die block and a shoulder 52 formed on the matrix die. Guiding pins 53 extend outward from a backing plate 54 into sockets or bores 55 formed in the die 48. The die 48 is provided with a longitudinal, axial bore 56 throughout its length. The bore terminates at the exposed or front end portion of the die 48 in a matrix 57 which is desirably hexagonal in contour or otherwise shaped in accordance with the intended exterior shape of the finished article to be forged within the matrix 57. A knock-out sleeve 58 is arranged in the bore 56 and includes a forward portion 59 of a cross-sectional shape and size to have a snug sliding fit within the matrix 57 of the die 48. The reduced portion 59 completely fills the matrix portion 57. The reduced portion 59 terminates in a shoulder 60 at the junction with the main body portion of the knock-out sleeve 58. The shoulder on the knock-out sleeve is arranged to oppose a shoulder 61 formed in the bore 56, for limiting outward movement of the sleeve 58 relative to the die 48, so that, although the reduced portion 59 can be caused to move to a position in which its outer end protrudes slightly beyond the outer face of the die 48, the sleeve 58 cannot escape from the bore 56. Back of the sleeve 58 within the bore 56 is arranged an actuating sleeve 62 which is freely shiftable in the bore 56, the outer end of the sleeve 62 resting against the inner end of the sleeve 58, and the inner end of the sleeve 62 resting against actuating pins 63, 63. The actuating pins 63, 63 are slidingly mounted in the retainer disc or backing plate 54 and extend through the backing plate. An appropriate set screw 64 is employed to lock the plate or disc 54 against movement. The rear ends of the pins 63 rest against the forward end of a knock-out rod 65 which extends through the frame-work of the machine back to an actuating lever 66 which is pivoted at 67 and has its free end engaging a thrust rod 68. The thrust rod 68 imparts timed impulses to the knock-out rod 65.

The knock-out rod 65 is provided at its forward end portion with an axial bore 69 having an enlargement 70 in its length affording a shoulder 71. A centering pin 72 is mounted in the bore 69 and extends freely along the bore. The centering pin is provided with an enlargement affording a shoulder 73 which faces toward the shoulder 71. A compression spring 74 is coiled about the pin 72 between the shoulders 71 and 73 to stress the pin 72 outward. A circumferential ridge or collar 75 is formed on the pin 72 immediately in the rear of the backing plate or retainer disc 54 to limit the possible extent of outward movement of the pin 72. The pin 72 extends through the backing plate 54, through the collar or sleeve 62, and through and beyond the knock-out sleeve 58. The exposed or front end portion of the pin 72 is proportioned to correspond in shape and size with the internal bore of a thimble-like blank and to preserve that shape and size of the bore in the finished capped nut blank. To that end, the pin 72 is provided with a parti-globular centering finger 76.

The matrix die 48, the sleeve 58, and the centering finger 76 jointly define a die-forming space within the outer end portion of the matrix 57.

The push-on finger 45 has a reduced finger portion 77 at its end for cooperating with the centering finger 76. The plunger die 46 is provided with a matrix or recess 78 complemental to the matrix 57, so that, when the two are brought together as seen in Figure 6, they have an internal surface contour corresponding with the external surface contour of the dome or cap and the sides of the finished capped nut blank. That is to say, the mouth portion of the cavity in the die 46 corresponds in cross-sectional shape and size with the matrix 57 and the internal portion of the cavity is dome-shaped.

A blank feeding mechanism is provided for delivering the thimble-like blanks of Figure 2 into position to be impaled upon the centering finger 76 by the push-on finger 77. Such feeding mechanism is seen in assembled relation with the other parts in Figure 4, and is illustrated in greater detail in Figures 8 and 9. The feeding mechanism includes a transversely reciprocating slide bar or carriage 79. A frame 80 is detachably fixed to the slide bar 79, as by a bolt 81, and the abutting shoulders of the contacting parts. Journalled in the inner end portion of the frame 80 is a shaft 82, the exposed or inner free end of which carries a fork or yoke 83 which, as seen in Figures 8 and 9, has its fork space or internal recess 84 shaped to correspond with and to snugly receive a thimble-like blank 20 when such a blank is dropped into the fork from above with the parti-globular closed end of the thimble downward. In other words, the fork, which constitutes the actual blank carrier, is formed with a blank-receiving pocket. Mechanism, not illustrated, is preferably employed, such as a feeding hopper and tube, for delivering thimbles to the fork 83, but obviously thimbles could be delivered thereto by hand if desired. A beveled gear 85 is affixed to the outer end portion of the shaft 82 and meshes with a similar gear 86 carried by an actuating shaft 87. A crank arm 88 extends upward from the shaft 87 and is provided with a laterally extending wristpin 89. The free end of the wristpin extends into an arcuate cam slot 90. This cam slot is formed in a bracket 91 affixed to a portion of the frame 47'. The cam slot may be of any desired shape but it is desirably formed, as illustrated, to be arcuate and to extend ninety degrees.

When the slide 79 is in its outermost position, the wristpin 89 is at the upper end of the slot 90 as seen in Figures 8 and 9, and the fork 84 is opened upward to receive a thimble-like shell 20; but, as the slide 79 begins to move inward, or toward and across the effective path of the push-on finger, the wristpin 89 is caused to travel or shift along the slot 90 until it reaches the lower end of the slot. During this movement, the crank 88 turns counterclockwise (as viewed in Figure 9) and acts through the shaft 87 and beveled gears 86 and 85, to drive the shaft 82 through ninety degrees. As the slide 79 moves in the opposite direction the shaft 82 is rotated back to its original position. Thus, the carrier pocket is caused to stand in a receiving position at one side of the centering pin 59 with its pocket facing upward in position to receive a downwardly delivered blank in a mouth-upward attitude. As the slide 79 travels forward, however, the carrier is turned and turns the blank with it so that the blank is finally delivered with its bore aligned with the centering pin and the open end of the blank turned toward the centering pin. All of the parts are, of course, timed in their movements relative to one another, as is common practice in header mechanism, so that when the thimble-like shell is thus brought into line with the centering finger 76, the push-on finger 77 is caused to approach the blank and push it onto the centering finger 77 until it is fully seated on the centering finger. The parts are then in the position shown in Figure 5. As soon as the blank has been thus impaled, the fork 83 begins to recede and the push-on finger 77 also begins to recede. When the push-on finger 77 has reached the limit of its receding stroke, it is moved upward by the plunger slide 43 until the cavity or matrix 78 of the plunger die 46 is brought into line with the blank on the pin 72. The plunger die 46 then advances until it engages the blank or thimble, and then continues its advancing movement to compress the skirt portion of the blank longitudinally while expanding and spreading the skirt portion laterally until the finished blank 92 is produced as seen in Figure 3.

As soon as this is accomplished, the plunger die 46 begins to recede and the knock-out rod 65 advances and causes the knock-out sleeve 58 to push the finished blank out of the matrix 57 and off of the centering finger 76. The rod 65 then recedes, leaving the parts ready for the next thimble-like blank to be applied to the projecting end of the centering finger 72. It will be observed that the advance of the push-on finger 77 against the thimble-like blank for impaling the blank on the centering finger 76 pushes the knock-out sleeve 58 with the collar 62 and the pin 63 back to the position seen in Figures 5 and 6.

It should be noted also that the die block 49 is formed with an appropriate recess 93 which may accommodate the finger 77 at the non-operating stroke thereof, that is to say, at the stroke which causes the plunger die 46 to shape the blank within the matrix 57 and the matrix or cavity 78. The finishing die 46, on the other hand, is accommodated beneath the die 48 when the finger 77 is pushing the blank onto the centering finger 76. The floating capacity of the die 48 enables cooperative adjustment and compensating movements to be effected so that the results seen in Figure 3 may be accomplished. It will be understood by those familiar with standard headers that the knock-out rod 65, when in its retracted position, as seen in Figures 5 and 6, is firmly held against further backing off, so that the pin 63, collar or sleeve 62 and knock-out sleeve 58, cannot back off. The knock-out sleeve 58 therefore provides an abutment against which the free edges of the blank are shaped.

It will be noted from the foregoing that the thimble-like shell or blank 20 of Figure 2 is substantially circular in cross-section throughout the greater part of its length, and that the action of the matrices 57 and 78 effects expansion to a poly-sided contour of the nut body and the perfectly finished dome or parti-globular cap.

While I have disclosed herein a particular machine constituting a practical and desirable embodiment of the invention, it is to be understood that such disclosure is intended to be illustrative, not restrictive, and that it is my purpose to claim the invention in whatever form its principle may be utilized.

What is claimed is:

1. In mechanism for forming capped nut blanks from thimble-like shells, the combination with double-stroke header mechanism and a floating matrix die therein, of plunger dies cooperating with the matrix die, one of the plunger dies having a push-on finger and the other a matrix, and a centering pin located in the matrix of the floating die to receive a thimble-like shell thrust into the matrix of the floating die by said finger, the matrix of the plunger die being proportioned to cooperate with the matrix of the floating die for forging the thimble-like shell into the completed contour of a capped nut.

2. In mechanism for forming capped nut blanks, from thimble-like shells, the combination with double-stroke header mechanism and cooperating dies therein, one of said dies being adapted to receive a thimble-like shell presented endwise with its open end toward the die, of means for feeding thimble-like shells to said last-named die in the stated position, and means for turning said feeding means from the feeding position to a position for receiving a thimble-like shell delivered by gravity.

3. The combination as claimed in claim 2, with means for reciprocating the said feeding means between the receiving and feeding positions, and means actuated incident to such reciprocating motions for turning the feeding means to the respective positions.

4. The combination as claimed in claim 2, with means for reciprocating the said feeding means between the receiving and feeding positions, and means actuated incident to such reciprocating motions for turning the feeding means to the respective positions, the last-named means comprising intermeshing gears, a crank for actuating the same, and a slotted bracket engaged by the crank for rotating the crank incident to reciprocation of the crank with the feeding means.

5. In a machine for die-forming capped nut blanks from thimble-like blanks, in combination, a plunger die having a forming cavity for receiving the closed end of a blank, a matrix die yieldingly supported against the thrust of the plunger die and having a bore therein of the same cross-sectional size and shape as the mouth of the forming cavity in the plunger die, a centering finger yieldingly supported against the thrust of the plunger die, said centering finger being disposed centrally of the matrix die and extending toward the plunger die, a sleeve snugly fitting within the bore of the matrix die and around the centering finger and having a sliding fit with each of them, and means for unyieldingly supporting the sleeve against the thrust of the plunger die at the forming stroke of the latter.

6. In a machine for die-forming capped nut blanks from thimble-like blanks, in combination, a plunger die having a forming cavity for receiving the closed end of a blank, a matrix die yieldingly supported against the thrust of the plunger die and having a bore therein of the same cross-sectional size and shape as the mouth of the forming cavity in the plunger die, a centering finger yieldingly supported against the thrust of the plunger die, said centering finger being disposed centrally of the matrix die and extending toward the plunger die, a sleeve snugly fitting within the bore of the matrix die and around the centering finger and having a sliding fit with each of them, and means for unyieldingly supporting the sleeve in a retracted position against the thrust of the plunger die at the forming stroke of the latter and for thrusting the sleeve outward after the completition of the forming stroke to strip the formed blank from the matrix die and from the centering finger.

7. A machine for die-forming capped nut blanks from thimble-like blanks, including, in combination, a plunger, a plunger die carried thereby, a matrix die cooperative with the plunger die, a centering finger extending through the matrix die and beyond the face thereof and yieldingly supported against the thrust of the plunger die, and means acting between each two successive forming strokes of the plunger die to align a thimble-like blank with the centering finger and to impale the blank upon the centering finger.

8. A machine as set forth in claim 7 wherein the blank aligning means comprises a blank carrier having a blank holding pocket movable from a receiving position at one side of the centering finger into blank delivering position, and means for turning the carrier as it travels to cause the pocket to face upward in blank receiving position and to face horizontally and toward the centering finger in blank delivering position.

9. A machine as set forth in claim 7 wherein the blank aligning means comprises a blank carrier having a blank holding pocket movable from a receiving position at one side of the centering finger into blank delivering position, a shaft upon which the carrier is supported, and means for rocking the shaft as the carrier travels to cause the pocket to face upward in blank receiving position and to face horizontally and toward the centering finger in blank delivering position.

10. A machine as set forth in claim 7 wherein the blank aligning means comprises a blank carrier having a blank holding pocket movable from a receiving position at one side of the centering finger into blank delivering position, a shaft upon which the carrier is supported, and means for rocking the shaft as the carrier travels to cause the pocket to face upward in blank receiving position and to face horizontally and toward the centering finger in blank delivering position comprising a crank, a driving train from the crank to the shaft comprising meshing beveled gears, and a cam for controlling the angular position of the crank.

11. A machine as set forth in claim 7 wherein the blank aligning means comprises a blank carrier having a blank holding pocket movable from a receiving position at one side of the centering finger into blank delivering position, a shaft upon which the carrier is supported, and means for rocking the shaft as the carrier travels to cause the pocket to face upward in blank receiving position and to face horizontally and toward the centering finger in blank delivering position, comprising a crank movable to and fro with the carrier and connected to rock the shaft, and a stationary cam for rocking the crank and controlling the angular position thereof as an incident of the travel of the crank with the carrier.

12. A machine as set forth in claim 7, wherein the blank aligning means comprises a blank carrier having an open mouthed pocket movable from a receiving position at one side of the centering finger into blank delivering position with the mouth of the pocket facing the centering finger, the carrier having a slot in its end which extends through the base of the pocket, and wherein the impaling means consists of a push-on finger carried by the plunger and operable through said slot.

13. In a machine for die-forming capped nut blanks from thimble-like blanks, in combination, a blank supporting and centering finger, means for impaling successive blanks upon the finger, die means surrounding the finger and cooperating therewith to form a blank shaping cavity, a plunger die cooperative with said finger and said cooperating die means, means for imparting a blank forming stroke to said plunger die, and spring means holding the centering finger normally projected beyond the shaping cavity of the surrounding die means and yieldingly supporting the finger against the thrust of the plunger die at the forming operation.

14. In a machine for shortening and thickening the skirt portions of thimble-like blanks to convert such blanks into capped nut blanks, in combination, die means forming a die cavity comprising a centering finger, a bored matrix die and an interposed sleeve, a plural stroke plunger, a push-on pin and a plunger die mounted on the plunger and carried alternately toward said die means in alignment therewith at alternate forward strokes of the plunger, and means operating in timed relation to the plunger to present a blank in line with the centering finger in position to be thrust on the finger as the push-on pin is advanced toward said die means.

HEYMAN ROSENBERG.